United States Patent [19]

Hayashi et al.

[11] Patent Number: 4,790,202
[45] Date of Patent: Dec. 13, 1988

[54] DRIVE APPARATUS FOR POWER SEATS

[75] Inventors: Masayuki Hayashi, Toyohashi; Takumi Sasaki, Kariya, both of Japan

[73] Assignee: Aisin Seiki Kabushiki Kaisha, Japan

[21] Appl. No.: 933,539

[22] Filed: Nov. 21, 1986

[30] Foreign Application Priority Data

Nov. 26, 1985 [JP] Japan .................. 60-263911

[51] Int. Cl.4 .................. F16H 1/16; F16H 35/06
[52] U.S. Cl. .................. 74/396; 74/425; 384/42
[58] Field of Search .................. 74/396, 425, 89.14; 384/37, 42, 908, 912

[56] References Cited

U.S. PATENT DOCUMENTS 4,114,945  9/1978  Lutz .................. 384/42
4,645,159  2/1987  Terada et al. .................. 248/429

FOREIGN PATENT DOCUMENTS 60-151731  10/1960  Japan .

Primary Examiner—Allen D. Herrmann
Attorney, Agent, or Firm—Finnegan, Henderson Farabow, Garrett and Dunner

[57] ABSTRACT

An apparatus for driving a power seat in an automotive vehicle includes a worm threadedly engaged with a worm wheel accommodated in a housing and receiving driving power, a plug supporting one end of the worm, a screw threadedly engaged with the housing for supporting the plug in the housing bore, a damper provided in the bore so as to face one side of the plug, and a spacer offering little frictional resistance interposed between the damper and the one side of the plug. The plug is moved up and down relative to the housing by turning the screw, thereby aligning the central axes of the worm wheel and worm, the spacer reducing the frictional resistance working against the plug so that the latter is capable of being slid smoothly and with fine precision.

3 Claims, 3 Drawing Sheets

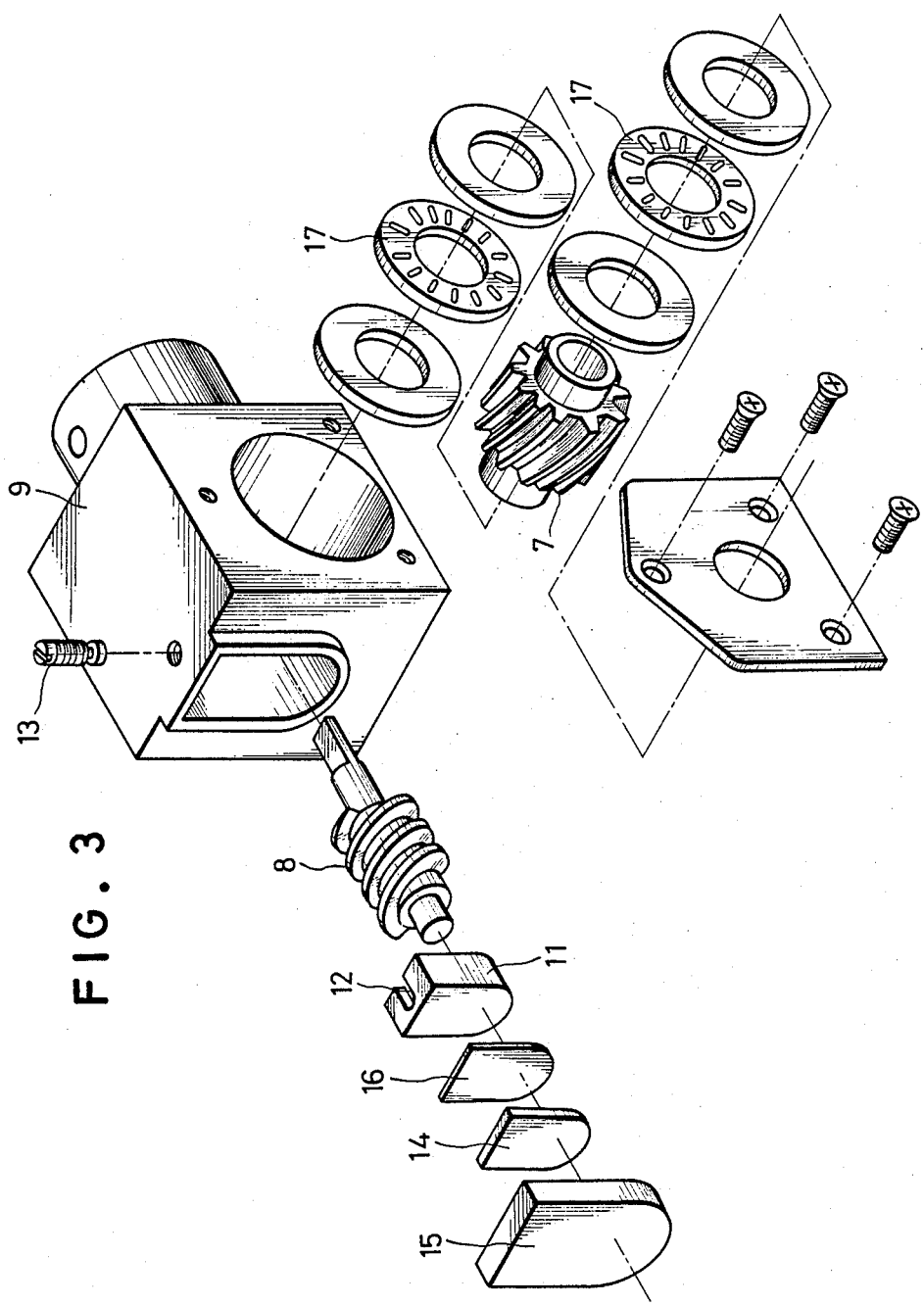

DRIVE APPARATUS FOR POWER SEATS

BACKGROUND OF THE INVENTION

This invention relates to improvements in an apparatus for driving a power seat in automotive vehicles or the like.

As shown in FIG. 1, a common mechanism for applying power to a seat of an automotive vehicle to move the seat comprises a motor 2 fixedly secured to a lower bracket 1 on the vehicle body, a power seat drive apparatus 3 fixedly secured to the lower bracket 1, a screw rod 4 coupled to the drive apparatus 3, and a nut member 6 fixedly secured to an upper bracket 5 slidably engaged with the lower bracket 1 and supporting a seat cushion. Turning the screw rod 4 causes the nut member 6 to slide along the screw rod 4, thereby moving the upper bracket 5 back and forth relative to the lower bracket 1.

A prior-art example of the drive apparatus 3 used in the above-described mechanism is illustrated in FIG. 2. The drive apparatus 3 includes a worm 8 fixedly secured to the output shaft of the motor 2, a worm wheel 7 threadedly engaged with the worm 8, a housing 9 having a bore 10, and a plug 11 fitted in the bore 10 and having a groove 12 formed in one end thereof. One end portion of the worm 8 is supported in the bore 10 of housing 9, and the other end of the worm 8 is supported by the plug 11. A screw 13 threadedly engaged with the housing 9 has an end portion of enlarged diameter received in the groove 12, thereby retaining the plug 11 in the bore 10 of housing 9. A damper 14 consisting of e.g. polyurethane is disposed in the bore 10 in abutting contact with one side of the plug 11. The opening of the housing 9 is covered by a cover 15.

The worm wheel 7 and worm 8 are aligned by turning the screw 13 so that the plug 11 supporting one end of the worm 8 will move relative to the housing 9. It should be noted that the end of the worm 8 is coupled to the motor 2 (FIG. 1) so that the rotational torque of the motor 2 is transmitted to the screw rod 4 through the worm wheel 7 and worm 8.

The alignment of the worm wheel 7 and worm 8 is extremely important for the sake of preventing the occurrence of noise during the operation of the power seat. After the drive apparatus 3 is assembled, the alignment is performed by turning the screw 13 to move the plug 11 up and down in the bore 10 of the housing 9. With the conventional arrangement, however, the plug 11 does not slide well on the damper 14 so that moving the plug 11 causes the damper 14 to drag behind it. When the damper 14 returns to its original state during operation of the power seat, therefore, the relationship between the central axes of the worm wheel 7 and worm 8 undergoes a shift and an abnormal noise is produced.

SUMMARY OF THE INVENTION

An object of the present invention is to provide a power seat drive apparatus in which the relationship between the central axes of the worm and worm wheel can be finely adjusted.

Another object of the present invention is to provide a power seat drive apparatus in which the relationship between the central axes of the worm and worm wheel can be finely adjusted in a short period of time.

According to the present invention, the foregoing objects are attained by providing an apparatus for driving a power seat, comprising a housing having a bore, a worm wheel accommodated in the housing for receiving a driving force, a worm accommodated in the housing and threadedly engaged with the worm wheel, a plug provided in the bore for supporting one end of the worm, a screw threadedly engaged with the housing and supporting the plug in the bore, a damper provided in the bore so as to face one side of the plug, and a spacer interposed between the damper and the one side of the plug.

Thus, the spacer does not allow the plug to come into direct contact with the damper and offers little sliding resistance to the plug when the latter is moved for adjustment. This enables the alignment of the central axes of the worm and worm wheel to be finely adjusted by turning the screw.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a perspective exploded view illustrating a power seat drive apparatus embodying the present invention.

DESCRIPTION OF THE PREFERRED EMBODIMENT

Figure 1:
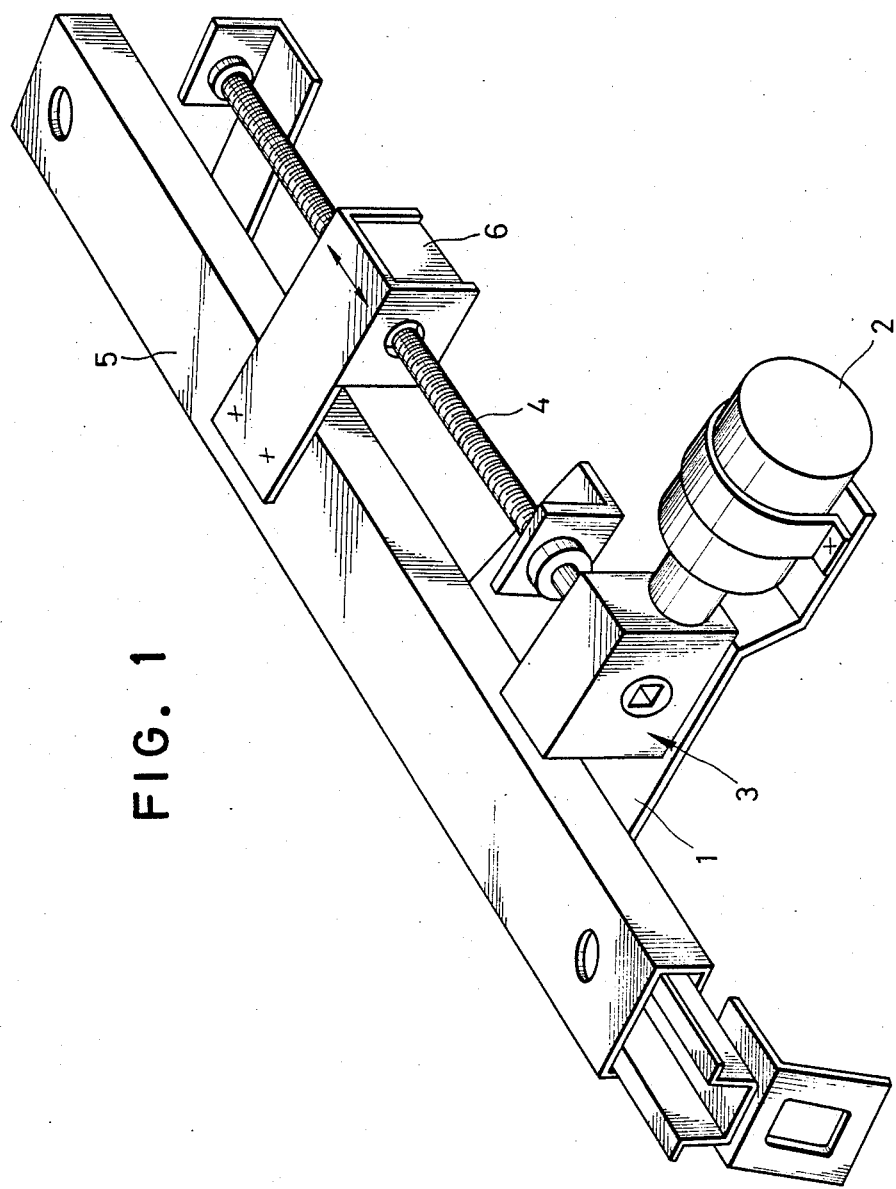
FIG. 1 is a perspective view illustrating a power seat drive mechanism.
Figure 2:
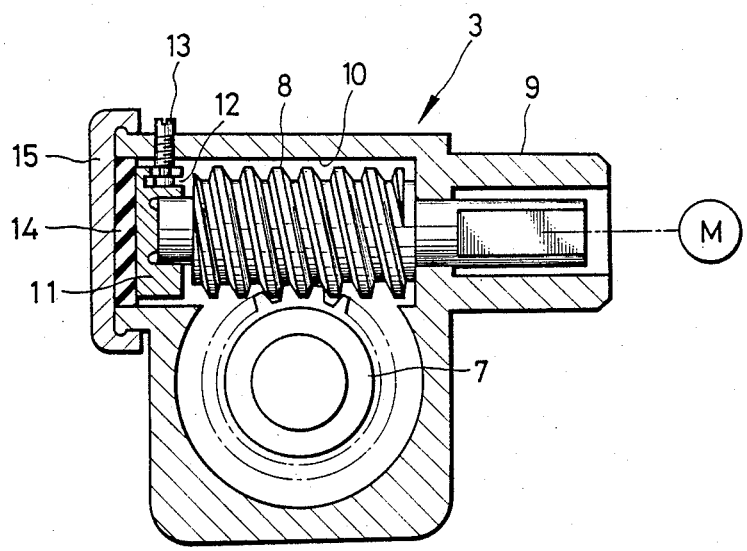
FIG. 2 is a sectional view illustrating a conventional drive apparatus employed in the power seat drive mechanism of FIG. 1.

An embodiment of a power seat drive apparatus in accordance with the present invention will now be described with reference to FIGS. 3 and 4. Portions similar to those shown in FIGS. 1 and 2 are designated by like reference characters and need not be described again.

Figure 4:
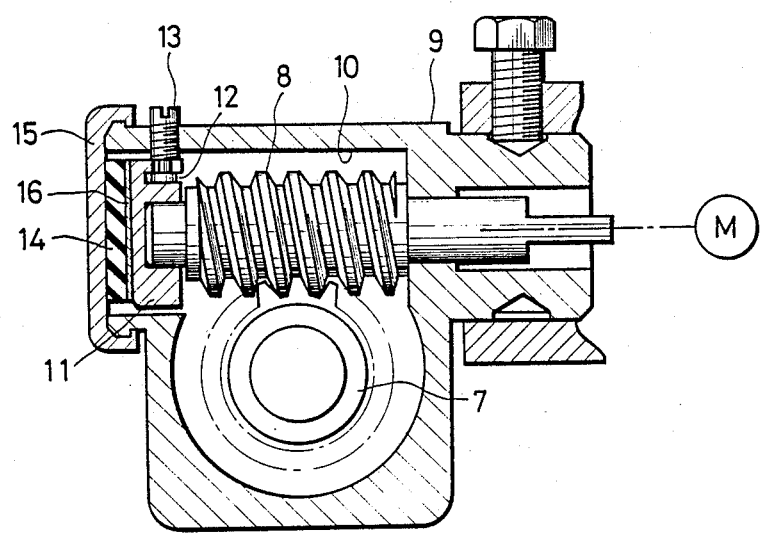
FIG. 4 is a sectional view of the power seat drive apparatus shown in FIG. 3.

As shown in FIGS. 3 and 4, the worm 8 has one end supported in the housing 9 and its other end supported by the plug 11. As in FIG. 2, the plug 11 has the groove 12 in which the enlarged diameter portion at the lower end of the screw 13 is received. The screw 13 is threadedly engaged with the housing 9. Turning the screw 13 moves the plug 11 up and down relative to the housing 9 as viewed in FIG. 4.

According to a characterizing feature of the invention, a spacer 16 is interposed between the damper 14 and the plug 11. The spacer 16 consists of a material which offers little frictional resistance, such as a synthetic resin sheet of Teflon or the like or a metal plate. Numeral 15 denotes the cover. The worm wheel 7 threadedly engaged with the worm 8 is supported in the housing 9 through the use of bearings 17.

When the plug 11 is moved up and down by turning the screw 13 to align the central axes of the worm wheel 7 and worm 8, the spacer 16 reduces the frictional resistance working against the plug 11 so that the latter is capable of being slid smoothly and with fine precision. The plug 11 is in contact with the inner wall surface of the bore 10 in housing 9 in terms of the width direction of the plug so that the latter is prevented from rotating within the bore 10. The shapes of the spacer 16 and damper 14 are not limited to those shown in the drawings. If desired, a round spacer and damper can be employed.

Thus, the spacer 16 prevents the plug 11 from directly contacting the damper 14 and allows the plug 11 to be slid smoothly. The plug 11 therefore will respond correctly to movement of the screw 13 so that the plug 11 will travel by an amount corresponding to screw movement. This facilitates the adjusting operation for aligning the central axes of the worm wheel 7 and worm 8 and enables the adjustment to be performed in a shorter period of time. Since these advantages are obtained merely by providing the spacer and without greatly modifying the conventional arrangement, the manufacturing process is the same as before. This makes it possible to obtain the above advantages in an economical manner.

As many apparently widely different embodiments of the present invention can be made without departing from the spirit and scope thereof, it is to be understood that the invention is not limited to the specific embodiments thereof except as defined in the appended claims.

What we claim is:

1. An apparatus for driving a power seat, comprising:
   a housing heaving a bore;
   a rotatably driven worm wheel disposed in said housing, said worm wheel having teeth;
   a worm disposed at one end in said housing, said worm having helical threads for engaging said teeth;
   a cover closing one end of said bore;
   a plug disposed in said bore, said plug supporting said worm at one end thereof and being radially movable in a direction toward and away from said worm wheel for positioning said helical threads relative to said teeth, said plug having a planar surface opposing said cover;
   a damper positioned between said cover and the planar surface of said plug, said damper having a surface with a first coefficient of friction;
   a spacer interposed between said damper and the planar surface of said plug, said spacer having a surface with a second coefficient of friction less than the first coefficient of friction, said damper being in frictional contact between said spacer and said cover for urging the helical threads of said worm radially into engagement with said wheel; and
   screw means for slidably adjusting the radial position of the plug in the bore relative to the spacer.

2. The apparatus according to claim 1, wherein said spacer comprises a sheet of synthetic resin.

3. The apparatus according to claim 1, wherein said spacer comprises a metal plate.

* * * * *